(12) United States Patent
Aschwanden et al.

(10) Patent No.: US 12,320,968 B2
(45) Date of Patent: Jun. 3, 2025

(54) TUNABLE OPTICAL DEVICE

(71) Applicant: Optotune AG, Dietikon (CH)

(72) Inventors: Manuel Aschwanden, Allenwinden (CH); David Andreas Niederer, Küttigen (CH); Roman Patscheider, Winterthur (CH); Christopher Laning, Windisch (CH); Pit Gebbers, Dietikon (CH)

(73) Assignee: OPTOTUNE SWITZERLAND AG, Dietikon (CH)

( * ) Notice: Subject to any disclaimer, the term of this patent is extended or adjusted under 35 U.S.C. 154(b) by 513 days.

(21) Appl. No.: 17/665,635

(22) Filed: Feb. 7, 2022

(65) Prior Publication Data

US 2022/0252860 A1 Aug. 11, 2022

(30) Foreign Application Priority Data

Feb. 7, 2021 (WO) .................. PCT/IB2021/050979
Mar. 9, 2021 (DE) .......................... 102021105705.1

(51) Int. Cl.
| | | |
|---|---|---|
| G02B 3/14 | (2006.01) | |
| G02B 26/00 | (2006.01) | |
| G02B 27/01 | (2006.01) | |
| G02C 7/02 | (2006.01) | |
| G02C 7/08 | (2006.01) | |

(52) U.S. Cl.
CPC ............. *G02B 26/004* (2013.01); *G02B 3/14* (2013.01); *G02B 27/0172* (2013.01); *G02C 7/081* (2013.01); *G02C 7/085* (2013.01); *G02B 2027/0178* (2013.01)

(58) Field of Classification Search
USPC .............................. 351/159.68; 359/665–667
See application file for complete search history.

(56) References Cited

U.S. PATENT DOCUMENTS

| 4,514,048 | A | * | 4/1985 | Rogers | ..................... G02B 3/14 |
| | | | | | 359/721 |
| 7,656,073 | B2 | * | 2/2010 | Doshida | ................... G02B 3/12 |
| | | | | | 310/330 |
| 10,928,558 | B1 | * | 2/2021 | Cooke | ...................... G02B 3/14 |
| 11,378,806 | B1 | * | 7/2022 | Cooke | ................. G02B 26/004 |
| 2010/0128358 | A1 | * | 5/2010 | Szilagyi | ................... G02B 3/14 |
| | | | | | 359/666 |
| 2019/0320098 | A1 | * | 10/2019 | Kang | ..................... G02B 7/023 |
| 2020/0371360 | A1 | | 11/2020 | Dalrymple et al. | |
| 2021/0132387 | A1 | | 5/2021 | Stevens | |
| 2023/0048232 | A1 | * | 2/2023 | Carr | ..................... G02B 27/646 |

FOREIGN PATENT DOCUMENTS

| DE | 102017109051 | 11/2017 |
| DE | 102018002772 | 10/2018 |
| DE | 102020201114 | 8/2021 |
| EP | 2638417 | 9/2013 |
| GB | 2576173 | 2/2020 |

* cited by examiner

*Primary Examiner* — Darryl J Collins
(74) *Attorney, Agent, or Firm* — JMB Davis Ben-David

(57) ABSTRACT

Tunable optical device comprising an optical element, an actuator and a transmission unit, wherein the transmission unit comprises a first fiber, the first fiber is arranged to transmit a tensile force from the actuator to the optical element, and the tensile force result in a change of an optical property of the optical element.

17 Claims, 9 Drawing Sheets

TUNABLE OPTICAL DEVICE

CROSS-REFERENCE TO RELATED APPLICATIONS

Benefit is claimed to International Patent Application No. PCT/IB2021/050979, filed Feb. 7, 2021, and to German Patent Application No. 102021105705, filed Mar. 9, 2021; the contents of both of which are incorporated by reference herein in their entirety.

FIELD

The present disclosure concerns a tunable optical device.

BACKGROUND

A tunable optical device described here is based on the following considerations, among others. Tunable optical devices require some form of actuation, to control optical properties of the optical element which interacts with the electromagnetic radiation. However, when developing a suitable actuator, spatial limitations and weight limitations are diametrically opposed to the requirements in terms of power and precision.

The tunable optical device described here makes use of the idea, to transfer the force from the actuator to the optical element by means of the transmission unit. The first fiber of the transmission unit enables a spatial separation of the actuator and the optical element. Furthermore, the first fiber has particularly small spatial requirements and has a particularly low mass. Hence, the transmission unit reduces the spatial constraints related to the actuator.

SUMMARY

The tunable optical device is arranged to interact with electromagnetic radiation, in particular light in a wavelength range between infrared light and ultra-violet light. At least one optical property of the optical device is controlled in a definable manner. The optical property at least partially defines the interaction of light with the tunable optical device.

The tunable optical device comprises an optical element and an actuator with a transmission unit. The optical element interacts with the electromagnetic radiation by means of refraction and/or diffraction. The optical element is a tunable optical element, wherein at least one optical property of the optical element may be tuned. The optical element may be a lens, a mirror, a prism or a grating. In particular, the tunable lens is a refractive optical element, which is arranged to interact with electromagnetic radiation, in particular visible light, in a definable manner. For example, the tunable lens is arranged to tune optical properties like optical power and/or cylinder. At least one optical property of the optical element is altered when tuning the optical tunable device.

The actuator is arranged to transduce an electrical signal into a force. The actuator may be one of a voice-coil actuator, an electro-permanent-magnet actuator, an electro static actuator, a shape memory alloy actuator, a pneumatic actuator or a hydraulic actuator.

The transmission unit comprises a first fiber, wherein first fiber is arranged to transmit a tensile force from the actuator to the optical element. The first fiber may consist of a material having a youngs modulus of at least 10 GPa, in particular at least 100 GPa. In particular the first fiber is bendable. The first fiber may comprise carbon, Kevlar, metal, or a textile material. The first fiber may be a single fiber or a fiber bundle. The fiber has particularly small thermal expansion. In particular, the thermal expansion of the fiber is within the same magnitude as the surrounding material (less than 1% deviation). In particular, the fiber is not brittle and is tribologically resistant (little abrasion). The fiber may be lubricated. In particular lubricating the fiber does not result in swelling of the material of the fiber. The material of the fiber does not evaporate plasticizers. In particular, the material of the first fiber is insensitive to plasticizers.

The tensile force results in a change of an optical property of the optical element. The optical property may be at least one of, diffractive power, spherical power, cylinder angle, cylinder power, prism angle, prism power, reflectivity, transparency, or color. Preferable, the optical element is a tunable lens, wherein the optical property is spherical power, cylinder angle, cylinder power, prism angle, prism power.

According to one embodiment, the tunable optical device comprises the optical element and the actuator with a transmission unit. The transmission unit comprises a first fiber. The first fiber is arranged to transmit a tensile force from the actuator to the optical element. The tensile force results in a change of an optical property of the optical element.

According to one embodiment the tunable optical device comprises a retention element, wherein the retention element is arranged to generate a retention force. The retention force acts in an opposite direction with respect to the tensile force. The first fiber comprises a first end and a second end, wherein the first end is coupled to the actuator and the second end is coupled to the optical element. The tensile force acts on the first end, and the retention force acts on the second end. In particular, the retention force is provided by an elastic element. The elastic element may be a spring, a bending beam or a part of the optical element. For example, the retention force may act continuously. For example, when the tensile force exceeds the retention force, the tensile force results in a change of the optical property and when the retention force exceeds the tensile force, the retention force results in a reversal of said change of the optical property. For example, the transmission unit, in particular the first fiber, essentially transmits no compressive forces from the actuator to the optical element.

According to one embodiment, the tunable optical device comprises a second fiber and a pivot element. In particular, the second fiber is essentially identical to the first fiber. Hence, features disclosed for the first fiber also apply for the second fiber and vice versa. The pivot element comprises a pivot point around which the pivot element is rotatable. The second end of the first fiber and a second end of the second fiber are connected to opposite sides of the pivot element with respect to the pivot point. The tensile force of the first fiber causes a rotation of the pivot element in a first direction and the tensile force in the second fiber causes a rotation of the pivot element in a second direction, wherein the first direction is opposed to the second direction. In particular, the tensile force of the second fiber acts as the retention force for the first fiber and vice versa. For example, the pivot element is part of the transmission unit. In particular, the distance between the second end of the first fiber and the pivot point and the distance between the second end of the second fiber and the pivot point differs. Thus, identical tensile forces in the first and second fiber may result a rotation of the pivot element. The transmission unit may be arranged to transfer bidirectional forces from the actuator to the optical element.

According to one embodiment, the first fiber comprises a first section having a first main direction of extension, a second section having a second main direction of extension and a deflection section. The deflection section is arranged between the first section and the second section along the first fiber. The first main direction of extension is obliquely with respect to the second main direction of extension, and in the deflection section the first fiber is in contact with a deflection element. In particular, the deflection element is arranged to reroute the first fiber, whereby the tensional force is redirected. Advantageously the deflection element enables to adjust the geometry of the transmission element.

According to one embodiment, the deflection element comprises a mount and a guide element. The guide element is arranged to guide the deflection section. The guide element is in direct contact with the deflections section. The guide element is pivotably connected to the mount at a fulcrum, wherein a distance between the fulcrum and the deflection section varies along the deflection section.

For example, the guide element comprises a rail-like shape which prevents a sliding of the first fiber with respect to the guide element. In particular, the guide-element comprises a pulley, wherein the pulley has a non-circular shape and/or the fulcrum is not arranged at the center of the pulley. In particular, the guide element moves around the fulcrum with the first fiber, whereby sliding friction between the first fiber and the guide element is minimized. Advantageously, the deflection element may leverage the tensile force by means of the non-circular shape or by means of the non-centered fulcrum.

According to one embodiment, the transmission unit comprises a hull, wherein the first fiber and the hull from a Bowden cable. The first fiber and the second fiber may be arranged in a common hull. In particular, the first fiber and the second fiber form a Bowden cable. In particular, the deflection element may be formed by means of the hull.

According to one embodiment, the tunable optical device comprises a locking unit, wherein in an on-state the locking unit is arranged to maintain the optical property in a defined state, and in an off-state the locking unit does not confine changes of the optical property. The locking unit may be arranged to fix the transmission unit, in particular the first and/or second fiber, in a position, wherein the position is defined by means of the actuator. For example, the locking unit requires power supply to switch between the off-state and the on-state. The locking unit does not require power supply to maintain the off-state and/or on-state. Alternatively, the locking unit does not require power in the on-state and requires power to maintain the off-state. Thus, the locking unit automatically returns to the on-state, when no power is supplied. For example the locking unit is actuated by means of an electro permanent magnet actuator (EPM) or by means of a shape memory alloy. Advantageously, the locking unit enables a particularly energy efficient tunable optical device, by maintaining tuning states without requiring continuous power supply.

According to one embodiment the tunable optical device comprises a control unit and an accelerometer, wherein the accelerometer is arranged to measure an acceleration force acting on the optical device. The accelerometer transmits an output signal to the control unit and the output signal depends on a measured acceleration. The control unit is arranged to set the locking unit to an on-state when the output signal of the accelerometer exceeds a predefined value. The predefined value may correspond to an acceleration of 1 g. Alternatively, the predefined value may correspond to a pattern of acceleration forces, wherein the pattern of acceleration forces is determined from training data. In particular, the sensor is preconditioned by means of machine learning on order to define said pattern of acceleration forces. For example, the pattern of acceleration forces corresponds to typical acceleration conditions, which occur before acceleration forces of more than 1 g acting on the tunable optical device. In particular, the pattern of acceleration forces corresponds to a detected free fall of the tunable optical device, wherein the locking unit is arranged to switch into the on-state, when a free fall is detected. The locking unit may be arranged to remain in the on-state for a predefined timespan after the predefined value is exceeded. Advantageously, the locking unit prevents unintended motion of movable parts of the optical element, whereby the risk of damage caused by acceleration of the tunable optical device is reduced.

According to one embodiment, the actuator comprises a shape memory alloy. In particular, the shape memory alloy (abbreviated as SMA) provides the tensional force. A shape-memory alloy is an alloy that can be deformed when the material is below a threshold temperature and returns to its pre-deformed ("remembered") shape when heated above the threshold temperature. The SMA may also be called memory metal, memory alloy, smart metal, smart alloy, or muscle wire. In particular, the SMA is heated above the threshold temperature by applying a current to the SMA. The SMA may be deformed by means of the retention force.

According to one embodiment, the first fiber comprises the shape memory alloy. For example, the fiber comprises a passive portion and an active portion. Alternatively, the first fiber consists of the shape memory alloy. In this case, the first fiber is free of a passive portion. The passive portion consists of a material which has a particularly small elasticity for tensional forces. In other words, the passive portion has a particularly low tenso-elasticity. For example, the passive portion comprises a metal, Kevlar or carbon fiber. The tensoelasticity of the passive portion may be smaller than the tenso-elasticity of the active portion. The active portion comprises the SMA, which is arranged to generate the tensile force. For example, the passive portion is arranged between the active portion and the optical element. Thus, the passive portion transfers the tensile force from the active portion to the optical element.

According to one embodiment the actuator comprises a winding element, the first fiber is at least partially wound around the winding element, the actuator is arranged to rotate the winding element, wherein the tensile force is generated by rotation of the winding element. For example, the actuator comprises one of a stepper motor, an electric gear motor, a capacitor motor, a reluctance motor which is arranged to rotate the winding element.

According to one embodiment the tunable optical device comprises multiple first fibers, wherein the first fibers are arranged to transfer a tensile force from the actuator to the optical element. The winding element has a cylindrical shape and the winding element comprises multiple sections, wherein each first fiber is wound around one of the sections. At least two sections of the cylindrical shape have a different diameter and/or the cylindrical shape has a non-circular cross-sectional area. The sections with different diameters enable to deflect the first fibers by a different path length by means of a common winding element. The noncircular cross-sectional area of the cylindrical shape may result in a dependence of the pathlength of the deflection of the first fiber on the rotational position of the winding element. Advantageously, the sections having a different diameter and the non-circular cross-sectional area of the winding element enable a particularly distinct deflection of the first fibers utilizing a single motor for generating the tensional forces.

In particular, an off-set tension of each first fiber is individually adjustable. For example, the tensile force (pretension) of each fiber is adjustable by adjusting a relative rotation of the sections with respect to each other. Moreover, a transmission of each first fiber may be individually adjustable. For example, the fibers may be attached to sections with a smaller or larger diameter to alter the transmission. In case the fibers are attached to a laver, the position of the attachment between the lever and the first fiber may be adjustable to alter the transmission.

According to one embodiment the tunable optical device comprises multiple first fibers, wherein the first fibers are arranged to transfer tensile force from the actuator to the optical element. The actuator comprises a lever and the first ends of the first fibers are coupled at different attachment points of the lever respectively. In particular, the actuator is arranged to swivel the lever. The first fibers are deflected by swiveling the lever, wherein the amount of the deflection of each first fiber depends on the position of the attachment point along the lever respectively. Advantageously, a single actuator may provide different amounts of deflection by providing a lever with multiple attachment points.

According to one embodiment, the optical element comprises a volume which is filled with a liquid, and the volume is delimited by means of a membrane, wherein the membrane forms an optical surface of the optical element. The volume may be a delimited region, which is at least partially passed through by electromagnetic radiation during normal operation. In particular, the volume is at least partially delimited by the membrane. The volume is filled with a fluid which may be in gaseous phase or in liquid phase. In particular the fluidic volume may be filled with a water-based liquid or with an oil-based liquid.

The membrane is connected to a shaping element, wherein the tensile force acts on the shaping element, and the tensile force results in a change of the shape of the optical surface, and the change of the shape of the optical surface results in a change of the optical property.

For example, the shaping element has a ring shape, wherein the shaping element surrounds the optical surface formed by the membrane. The tensile force and the retention force result in a motion of the shaping element along the optical axis of the tunable optical device. By adjusting the position of the shaping element along the optical axis, the shape of the membrane is altered. The membrane is flexible and delimits the fluidic volume on one side.

In particular, the fluid is directly adjacent to the flexible membrane. At least on optical property is adjustable by changing the shape of the flexible membrane. Here and in the following, the term "flexible" in the context of the membrane describes a property of the membrane which allows the membrane to be bent obliquely to its main plane of extension. In particular, the membrane is expandable. Here and in the following the term "expandable" in the context of the membrane describes a property of the membrane which enables to expand the membrane reversibly along its main plain of extension.

The shaping element is attached to the membrane. The shaping element may have a ring shape. In particular, the shaping element is attached to one surface of the membrane. In particular, the membrane and the shaping element are connected by a material bonded connection. Alternatively, the shaping element and the membrane may be fabricated in a one-piece manner, wherein the shaping element and the membrane are fabricated simultaneously in common fabrication steps. In particular, the shaping element and the membrane may comprise a same material. The main planes of extension of the shaping element and the membrane extend essentially parallel to each other. In a direction perpendicular to the main plane of extension, the thickness of the shaping element is larger than the thickness of the membrane. In particular, the stiffness of the shaping element is larger than the stiffness of the membrane. For example, the shaping element is arranged to transfer forces along the perimeter of the membrane, to control the deflection of the membrane along the perimeter of shaping element.

In top view, the shaping element may have a non-circular contour, wherein the contour of the shaping element extends within an imaginary circumcircle. Here and in the following, the "top view" is the perspective perpendicular with respect to the main extension plane of the shaping element in a non-deflected state. For example, the main plain of extension of the shaping element extends perpendicularly with respect to the optical axis. The shaping element may have a non-circular ring-shape seen in a top view. The width of the shaping element seen in a top view may be constant. Alternatively, the width of the shaping element may vary at different positions along the ring. The width of the shaping element is measured along the direction of the radius of the circumcircle. In particular, the contour of the ring is defined by the inner edge of the shaping element, wherein the inner edge faces the optically active area of the membrane. Here and in the following, the circumcircle is an imaginary circle which completely surrounds the contour of the shaping element, while having a minimum radius. In particular, the circumcircle may intersect the shaping element, because the inner edge of the circumcircle defines the contour.

When tuning the optical property of the optical element, the amount of deflection of the shaping element may be proportional to a lateral distance of the contour of the shaping element to the circumcircle. The lateral distance is measured along the main plain of extension of the shaping element. Here and in the following, the lateral distance is measured in the direction of the radius of the circumcircle. In particular, when altering the optical properties of the tunable lens, the deflection of a section of the shaping element increases with increasing lateral distance.

The shaping element is arranged to alter optical properties of the tunable lens by deflection. The deflection describes a displacement of the shaping element in a direction along the optical axis of the tunable lens. In particular a deflection of the shaping element results in a change of the shape of the membrane, whereby optical properties of the liquid lens are altered. Additionally, or alternatively, the shaping element is arranged to limit the deflection of the membrane, to alter optical properties of the liquid lens in a desired manner.

According to one embodiment a movement of the shaping element is guided by means of a hinge. For example, the optical element comprises a rigid back window and the shaping element is rigid. The back window may partially delimit the volume which is filled the liquid.

The hinge provides a mechanical connection between the back window and the shaping element. When moving the shaping element, the shaping element provides a swivel motion with respect to the back window, wherein the angular displacement of the shaping element is below 2°, preferably below 1°. In particular, the optical element comprises a bellows structure, which connects the shaping element and/ or the membrane to the back window. The bellows structure may be formed from a flexible membrane material. The bellows structure permits the swivel motion of the shaping element with respect to the back window and the bellows seals the volume in a liquid tight fashion.

The hinge may be formed by locally stiffened regions of the bellows structure. In the stiffened regions the bellows structure may delimit a motion of the shaping element with respect to the back window. In particular, the stiffened regions limit the relative motion of the shaping element and the back window to a rotational movement of the shaping element with respect to the back window around a rotational axis, wherein the rotational axis extends perpendicular with respect to the optical axis of the optical element. Advantageously guiding the movement of the shaping element by means of the hinge enables a simplified and a particularly space-saving actuation.

Alternatively, the shaping element is elastically deformable, the actuator comprises multiple first fibers, and the tensile forces are transferred to multiple deflection points of the shaping element, wherein the deflection points are spaced apart from one another. The tensile forces may be generated by a separate actuator for each deflection point. Alternatively, a single actuator may generate the tensile forces, which are applied to multiple deflection points. The portion of the deflection force applied to each of the deflection points may vary. The deflection points may be distributed along the shaping element. In particular, the deflection points are separated from each other. For example, the tensile forces applied to each of the deflection points is individually controllable.

According to one embodiment the optical element is a tunable lens, wherein the tunable optical properties are sphere, cylinder power and cylinder axis.

Here and in the following, meridians of the tunable optical element describe imaginary straight lines extending through the center of the circumcircle, wherein different meridians extend at an angle with respect to each other.

Sphere (abbreviated as SPH) indicates the amount of lens power, measured in diopters of focal length. The deflection of the membrane for sphere is equal in all meridians of the optical element. The optical element is arranged to alter the spherical lens power by a definable deformation of the membrane.

Cylinder (abbreviated as CYL) power indicates the optical power for astigmatism of the optical element. The membrane has a non-spherical surface shape for generating cylinder power. In particular, for generating cylinder power the membrane has a shape so that along a first meridian the membrane has no added curvature, and along a second meridian the membrane has the maximum added curvature, wherein the first meridian and the second meridian extend perpendicular with respect to each other. The optical element is arranged to alter the curvature of the membrane along the second meridian.

Cylinder axis describes the angle of the first meridian, which has no added curvature to correct astigmatism. In other words, the cylinder axis is the angle of the first meridian that is 90 degrees away from the second meridian, wherein the second meridian contains the cylinder power. The cylinder axis is defined with an angle from 1° to 180°. The optical element may be arranged to alter the cylinder axis from 1° to 180° angle.

In particular, optical properties are prism power and prism axis and add. Prism power is the amount of prismatic power of the optical element, measured in prism diopters ("p.d." or a superscript triangle). Prism power is indicated in either metric or fractional English units (0.5 or ½, for example). Prism corresponds to a tilt of the membrane's surface with respect to the optical axis. Prism power defines absolute of the angle by which the membrane's surface is tilted. The tunable lens may be arranged to alter the prism power.

Prism axis is the direction of prismatic power of the optical element. The prism axis indicates the angle of the meridian around which the surface of the optical element is tilted with respect to the optical axis. The prism axis may extend along any meridian. The prism axis may be defined by an angle from 1° to 360°. The optical element may be arranged to alter the prism axis from 1° to 360°.

Add is the added magnifying power applied to a portion of the optical element. In particular, an optical element with Add is a multifocal lens. The added magnifying power may range from +0.75 to +3.00 diopters.

According to one embodiment, the first fiber forms a flexible shaft. The actuator transmits a torque to the first end of the first fiber. The torque results in a rotation of the first fiber around its main axis of extension. The optical element is arranged to transduce the torque into the change of the optical property.

The flexible shaft is a connecting element for radial electromechanical power transmission. The flexible shaft may be created by winding several layers of wire around a core. As seen from the core towards the outer layers, each layer may be wrapped in the opposite direction to the previous layer.

The quality of the wires, the number of wires, the diameter of the wires, the type of winding of the wires and the tempering temperature during production of the flexible shaft determine the mechanical properties of the flexible shaft. Mechanical properties may be at least one of flexibility, torsional strength, power transmission, running properties at different speeds and loads in one or both directions of rotation.

In particular the wires comprise kevlar, carbon, steel, stainless steel or bronze. The wires may be brass-plated. The wires may have a diameter of 0.1 mm to 5 mm.

Here and in the following, torque is understood to be a specific kind of tensile force. Torque results from the tensile force being applied off axis, wherein said axis of the flexible shaft is defined by the core wire. Thus, the tensile force which is guided helically around the core wire results in the torque. Hence, the core wire guides the tensile force and at least one of the layers of wires wound around the core wire transmits the tensile force. In particular, a torque in a clockwise direction is transmitted by at least one of the layers of wires wound in a clockwise direction. A torque in a counterclockwise direction is transmitted by at least one of the layers of wires wound in a counterclockwise direction.

A head mountable device is also specified. In particular, a head mountable device described here comprises a tunable optical device described herein. Hence, all features disclosed for the head mountable device are also disclosed for the tunable optical device and vice versa.

According to one embodiment the head mountable device is at least one of spectacles, augmented reality glasses, virtual reality glasses.

Spectacles, also known as eyeglasses or glasses, are vision eyewear, comprising the optical elements mounted in a frame that holds them in front of a person's eyes, typically utilizing a bridge over the nose and temples which rest over the ears. Spectacles are typically used for vision correction, such as reading glasses and glasses used for nearsightedness.

In particular, the spectacles may be arranged to provide eye protection against flying debris, for example for construction workers or lab technicians. The spectacles may comprise protection for the sides of the eyes as well as in the optical elements. The spectacles may be arranged to filter against visible and near-visible light or radiation. The spectacles may be sunglasses, which allow for better vision in bright daylight, and may protect one's eyes against damage from excessive levels of ultraviolet light. In particular, the optical elements are tinted for protection against bright light or polarized to remove glare.

In particular, the spectacles may be arranged for viewing specific visual information. For example, the spectacles are arranged to experience three dimensional vision by means of stereoscopy.

The virtual reality glasses may be arranged to provide virtual reality for the wearer. In particular the virtual reality glasses may be arranged to experience video games, simulators or trainers. The virtual reality glasses may comprise a stereoscopic head-mounted display, providing separate images for each eye, stereo sound, and head motion tracking sensors, which may include gyroscopes, accelerometers, magnetometers, structured light systems. The head mountable device may comprise eye tracking sensors and gaming controllers.

Augmented reality glasses (abbreviated as AR glasses), also called smart glasses, are wearable computer glasses that add information alongside or to what the wearer sees. The augmented reality glasses may be arranged to superimpose information onto a field of view by means of an optical head-mounted display (OHMD) or embedded wireless glasses with transparent heads-up display (HUD) or augmented reality (AR) overlay. The AR glasses are arranged to reflect projected digital images as well as allow the user to see through the AR glasses. In particular, the AR glasses and/or the VR glasses are arranged to be interfaced by means of natural language voice commands.

AR glasses and/or VR glasses may be arranged to collect information from internal or external sensors. The head mountable device may be arranged to control or retrieve data from other instruments or computers. The AR glasses and/or VR glasses may be arranged to run a mobile operating system and function as portable media players to send audio and video files to the user via a Bluetooth or WiFi headset. The head mountable device may be arranged to perform lifelogging and activity tracker capability.

According to one embodiment the head mountable device comprises a temple, wherein the temple is arranged to establish a mechanical connection between the optical element and the head of a user, wherein the actuator is arranged in the temple. In particular, the temple has essentially the same coefficient of thermal expansion as the transmission element, in particular the first fiber.

In particular, the deflection section of the transmission unit is arranged in a region, where the temple is connected to the frame or the optical element. In particular, the temple is foldable with respect to the frame or the optical element.

BRIEF DESCRIPTION OF THE DRAWINGS

Further advantages and advantageous refinements and designs of the tunable optical device result from the following exemplary embodiments presented in connection with the figures.

It is shown in

Similar elements, identical elements or identically acting elements are provided with the same reference symbols in the figures. The figures and the proportions of the elements shown in the figures are not to be regarded as being to scale. Rather, individual elements can be shown exaggeratedly large for better illustration and/or for better understanding.

DETAILED DESCRIPTION

Figure 1:
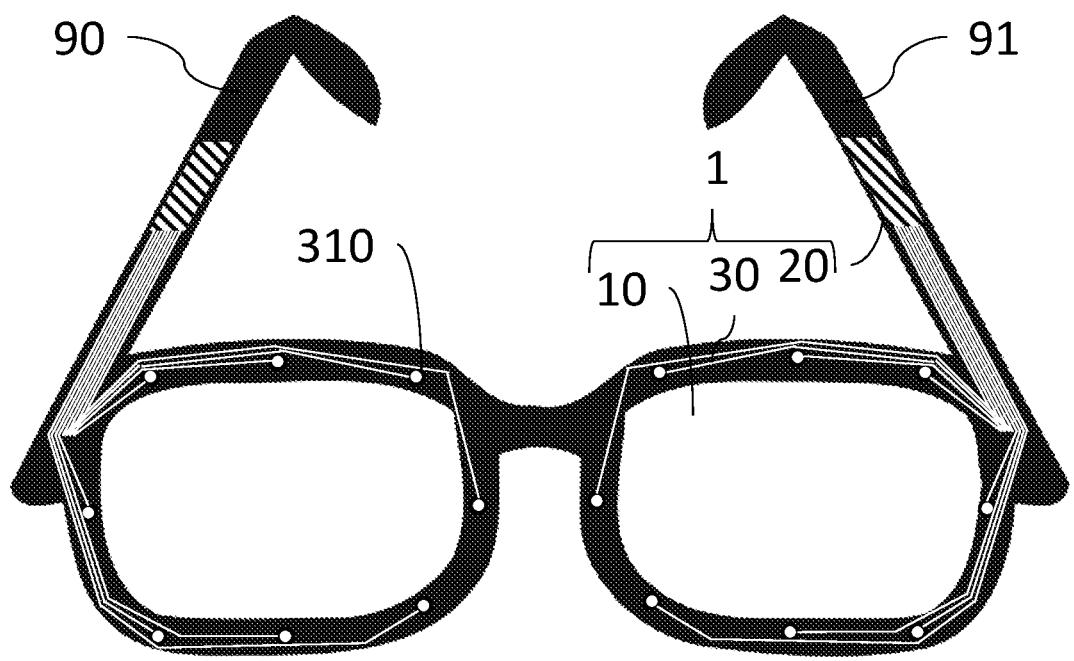
FIG. 1 exemplary embodiments of two tunable optical devices in a head mountable device in a schematic perspective view.

FIG. 1 shows exemplary embodiments of two tunable optical devices 1 in a head mountable device 90 in a schematic perspective view. The head mountable device 90 may be spectacles, augmented reality glasses or virtual reality glasses. The tunable optical devices 1 each comprise an optical element 10, an actuator 20 and a transmission unit 30. The transmission unit 30 comprises multiple first fibers 310, wherein the first fibers 310 are arranged to transmit a tensile force from the actuator 20 to the optical element 10. The tensile forces result in a change of an optical property of the optical element 10.

The head mountable device comprises a temple 91 The temple 91 is arranged to establish a mechanical connection between the optical element 10 and the head of a user, wherein the actuator 20 is arranged in the temple 91. The tunable optical elements 10 are tunable lenses respectively arranged in front of a user's eye.

Figure 2:
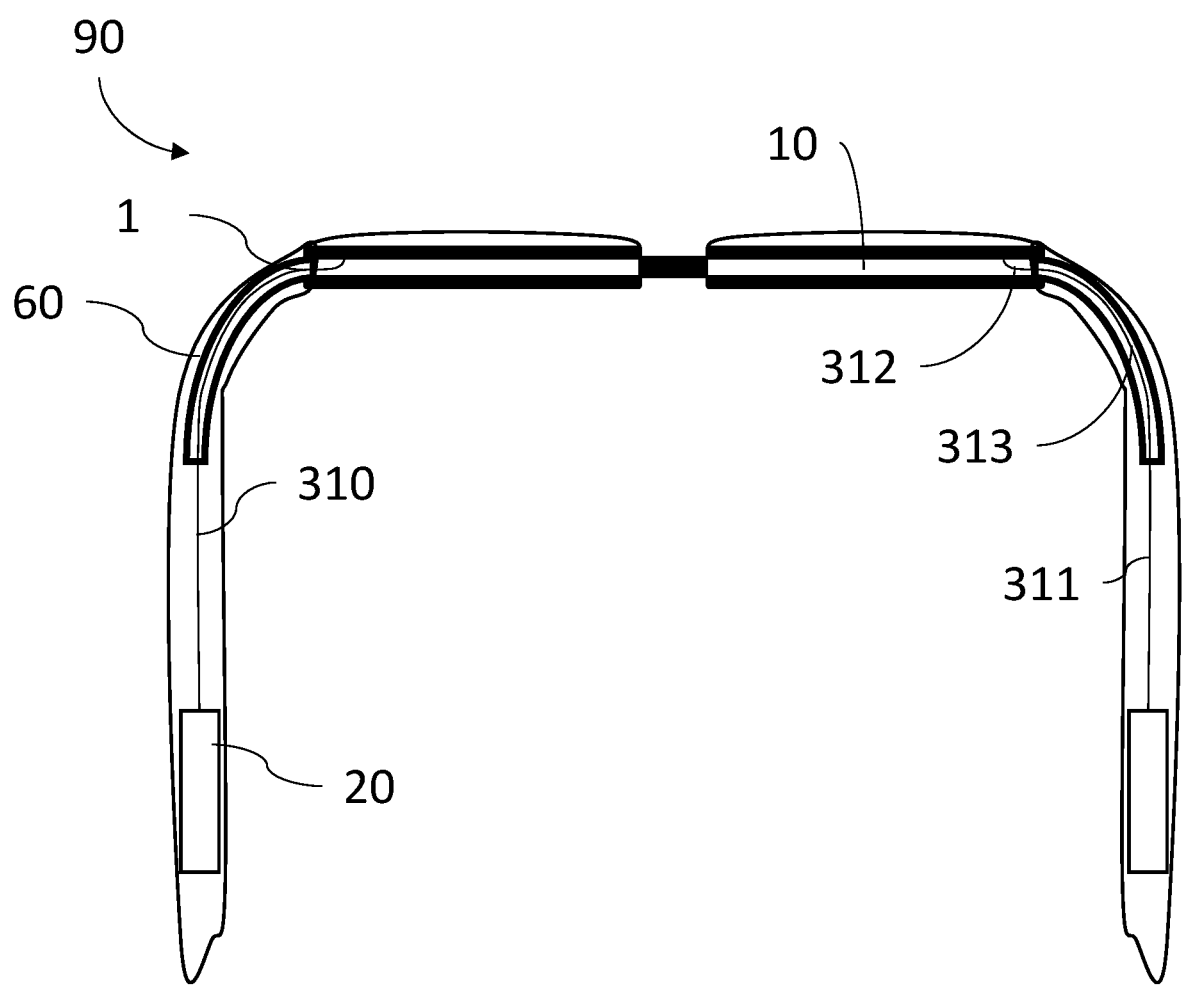
FIG. 2 exemplary embodiments of two tunable optical devices in a head mountable device in a schematic top view.

FIG. 2 shows exemplary embodiments of tunable optical devices 1 in a head mountable device 90 in a schematic top view. The actuators 20 are arranged in the temples 91. The forces generated by the actuators 20 are transmitted by means of the first fibers 310 to the optical elements 10. A section of the first fibers 310 extends within a hull 60. The first fiber 310 and the hull 60 form a Bowden cable.

The hull 60 is respectively in direct contact with the first fiber 310. The first fiber 310 comprises a first section 311 having a first main direction of extension, a second section 312 having a second main direction of extension and a deflection section 313. The deflection section 313 is arranged between the first section 311 and the second section 312 along the first fiber 310 and extends within the hull 60. The first main direction of extension is obliquely with respect to the second main direction of extension, and in the deflection section 313 the first fiber 310 is in contact with the hull 60, which forms a deflection element 70.

Figure 3:
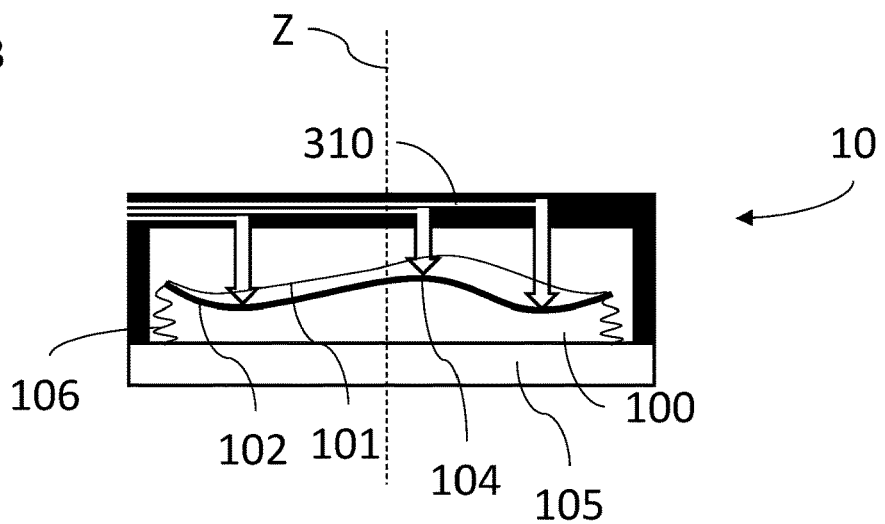
FIGS. 3, 4a, 4b and 5 exemplary embodiments of optical elements comprised in tunable optical devices in a schematic side view.

FIG. 3 shows an exemplary embodiment of an optical element 10 comprised in a tunable optical device 1 in a schematic side view. The optical element 10 is a tunable lens having an optical axis Z. The tunable optical element 10 comprises a volume 100 which is filled with a liquid. The liquid is transparent and the volume 100 is delimited by means of a membrane 101, a back window 105 and a bellows 106. The membrane 101 forms an optical surface of the optical element 10. The membrane 101 is connected to a shaping element 102, wherein the tensile forces from the first fibers 310 act on the shaping element 102. The shaping element 102 is flexible. Thus, different sections of the shaping element 102 may vary in their position along the optical axis z. The tensile forces result in a change of the shape of the optical surface, and the change of the shape of the optical surface results in a change of the optical property of the tunable optical element 10.

Figure 4A:
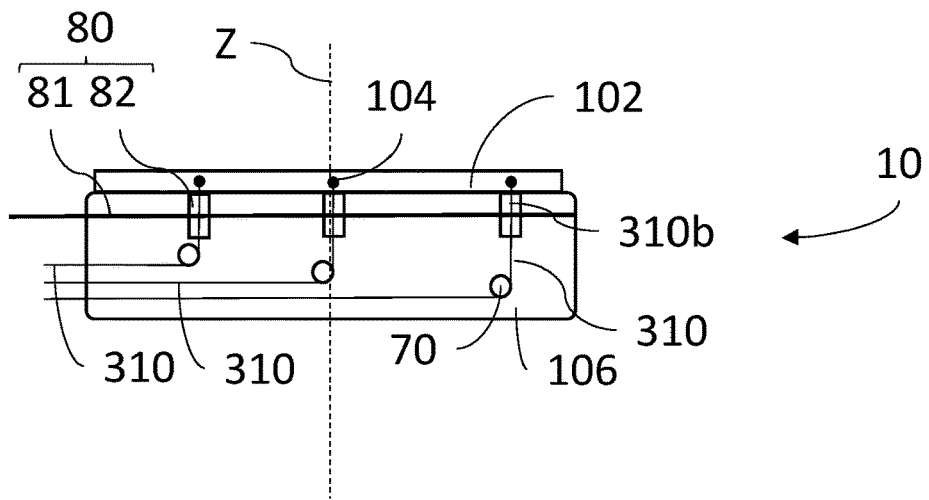

FIG. 4a shows an exemplary embodiment of an optical element 10 comprised in a tunable optical device 1 in a schematic side view. The first fibers 310 are attached to different deflection points of the shaping element 102. The tunable optical device 1 comprises a locking unit 80, wherein in an on-state the locking unit 80 is arranged to maintain the optical property at defined state, and in an off-state the locking unit 80 does not confine changes of the optical property.

The locking unit 80 is arranged to block the transfer of tensile forces from a first end 310a of the first fiber to the second end 310b when switched into an on-state. In an off-state the locking unit 80 does not delimit the motion of the first fibers 310. In the present embodiment, the locking unit 80 comprises a locking fiber 81 which extends crosswise with respect to the first fibers 310. The locking fiber 81 is arranged to press the first fibers 310 against locking pads 82 when the locking unit 80 is in the on-state. Thus, the actuation points 104 maintain their position along the optical axis Z, whereby a tuning state of the tunable lens 10 is maintained.

Figure 4B:
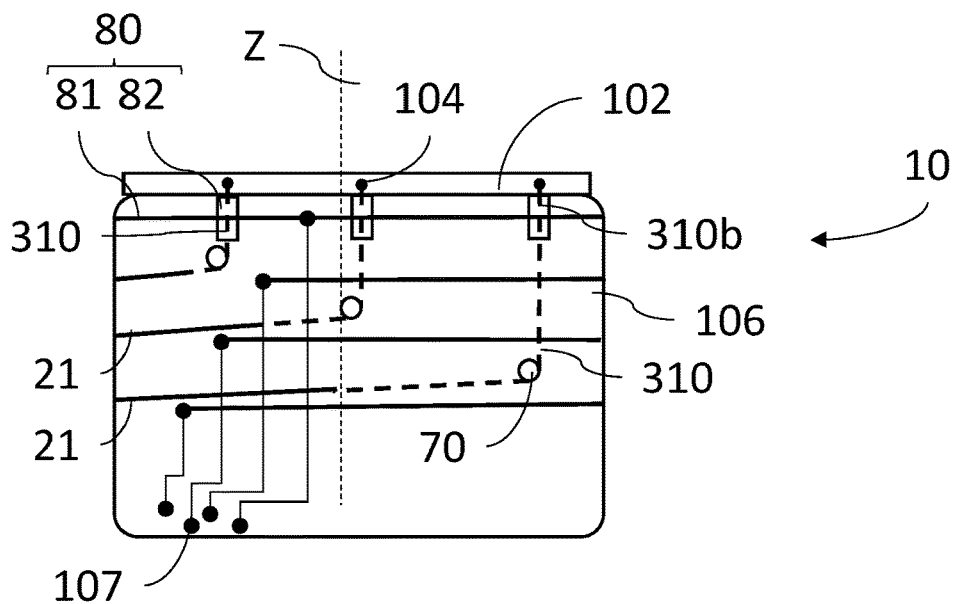

FIG. 4b shows an exemplary embodiment of an optical element 10 comprised in a tunable optical device 1 in a schematic side view. The first fibers 310 are attached to different deflection points of the shaping element 102. The tunable optical device 1 comprises a locking unit 80, wherein in an on-state the locking unit 80 is arranged to maintain the optical property at defined state, and in an off-state the locking unit 80 does not confine changes of the optical property. Here the locking unit 80 comprises a shape memory alloy (SMA), which extends circumferentially around the container. The container 106 provides a counter support for the SMA.

In particular, the container 106 provides a counter support for the actuator 20, which is arranged to tune the tunable optical component 10. The actuator 20 comprises multiple SMA fibers 21, which extend circumferentially around container 106. The actuator is connected to the first fibers 310, which are arranged to transfer a tensile force from the SMA to the shaping element 102. The SMAs 21 are electrically connectable by means of contact elements 107.

Figure 5:
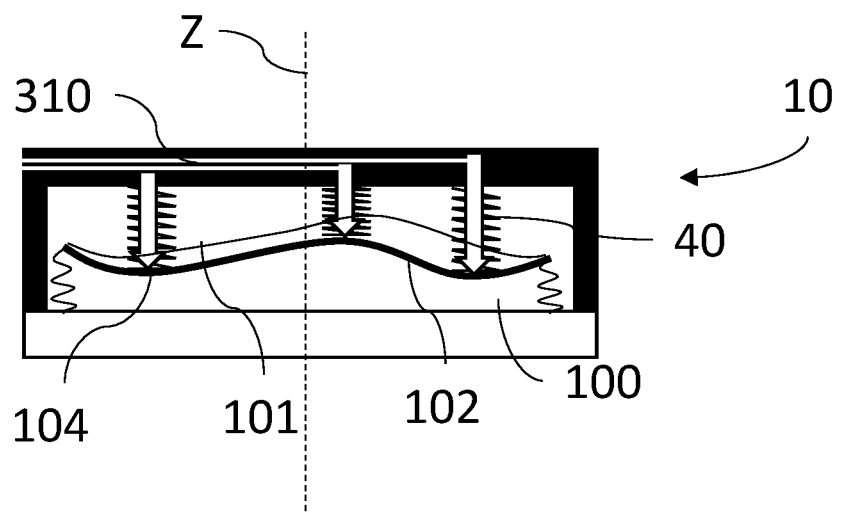

The first fibres 310 (dashed lines) are connected to an actuator 20 extending around a container 106 of the tunable optical element 10. The container 106 delimits the volume of the tunable optical element laterally. In particular, the container 106 is rigid and the container 106 does not deform when tuning the tunable optical element 10. The actuator comprises wire comprising shape memory alloy 21 (dashed lines), which are wrapped around the container 106. The FIG. 5 shows an exemplary embodiment of an optical element 10 comprised in a tunable optical device 1 in a schematic side view. The embodiment shown in FIG. 5 differs from the embodiment shown in FIG. 3 by comprising a retention element 40. wherein the retention element 40 is arranged to generate a retention force, wherein the retention force acts in an opposite direction with respect to the tensile force provided by the first fibers 310. The first fibers 310 comprises a first end 310a and a second end 310b, wherein the first end 310a is coupled to the actuator 20 and the second end 310b is coupled to the optical element 10. The tensile force acts on the first end 310a, and the retention force acts on the second end 310b. In the present embodiment, the retention element 40 comprises multiple springs, wherein the springs are arranged to move the shaping element 102 along the optical axis Z. In particular, the retention element 40 is arranged to return the tunable optical element 10 back to its non-tuned state, once the actuator 20 does not provide a tensile force and the locking unit 80 is a in the off-state.

Figure 6:
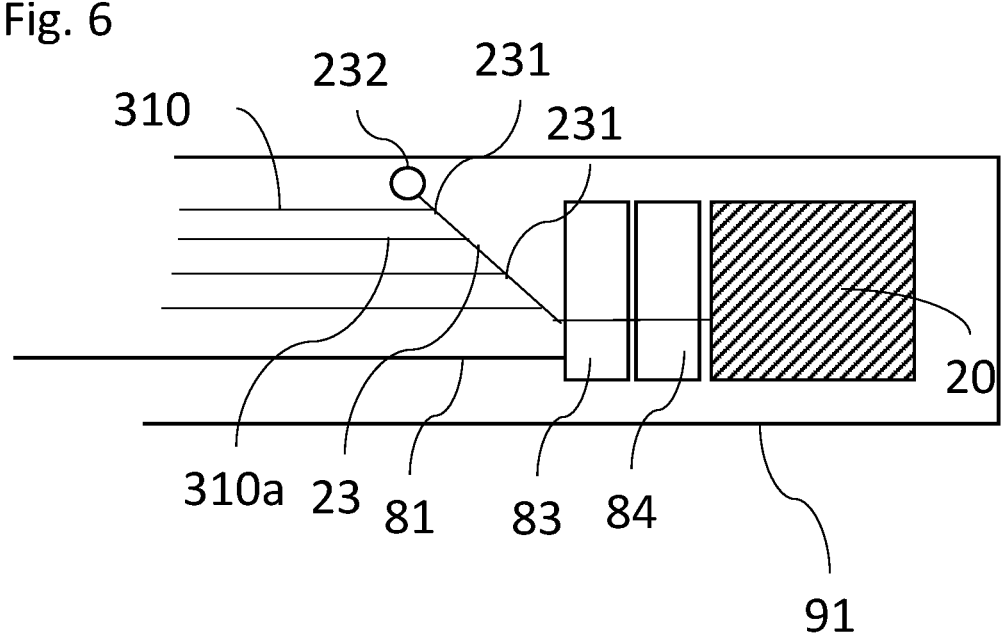
FIG. 6 an exemplary embodiment of an actuator comprised in a tunable optical device in a schematic side view.

FIG. 6 shows an exemplary embodiment of an actuator 20 comprised in a tunable optical device 1 in a schematic side view. The actuator is arranged within a temple 91. The tunable optical device 1 comprises a control unit 83 and an accelerometer 84, wherein the accelerometer 84 is arranged to measure an acceleration force acting on the optical device 10. The accelerometer 84 transmits an output signal 840 to the control unit 83. The output signal 83 is proportional to a measured acceleration, and the control unit 83 is arranged to set the locking unit 80 to an on-state when the output signal of the accelerometer 84 exceeds a predefined value.

The tunable optical device comprises multiple first fibers 310, wherein the first fibers 310 are arranged to transfer tensile force from the actuator 20 to the optical element 10. The actuator 20 comprises a lever 23, which is rotatably attached to a bearing 232. The first ends 310a of the first fibers 310 are coupled at different attachment points 231 of the lever 23 respectively. The range of motion of each first fiber 310 for a given stroke of the actuator 20 depends on the position of the respective attachment point 231 along the lever 23. The range of motion increases with increasing distance of the attachment point 231 to the bearing 232.

Advantageously, the lever 23 enables to transmit a single stroke in multiple different ranges of motions of the first fibers 310.

Figure 7:
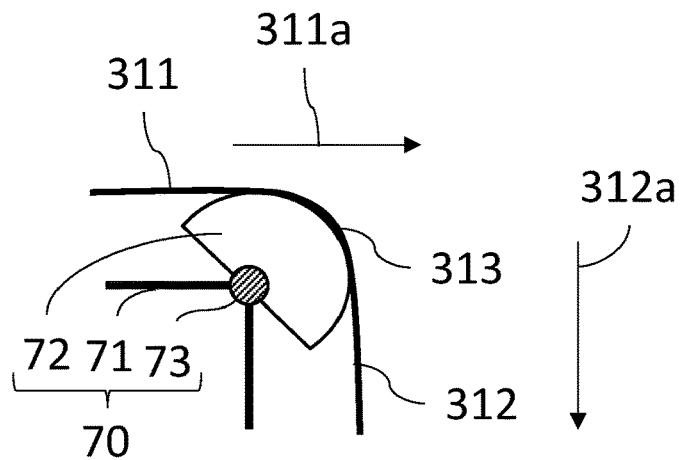
FIGS. 7, 8 and 9 exemplary embodiments of deflection elements comprised in a tunable optical device.
Figure 8:
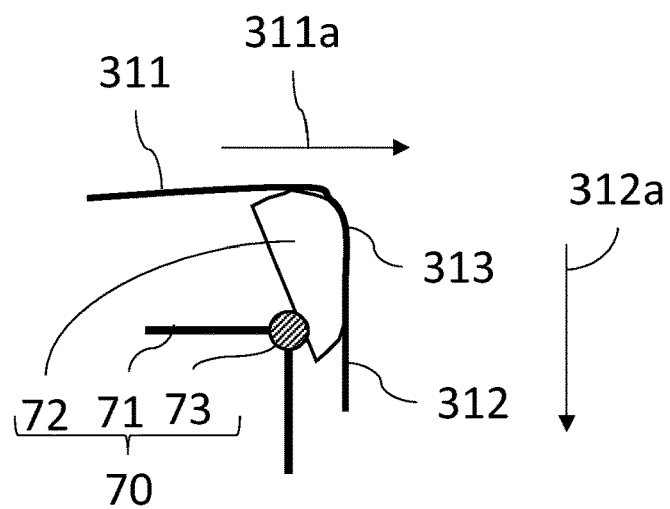
Figure 9:
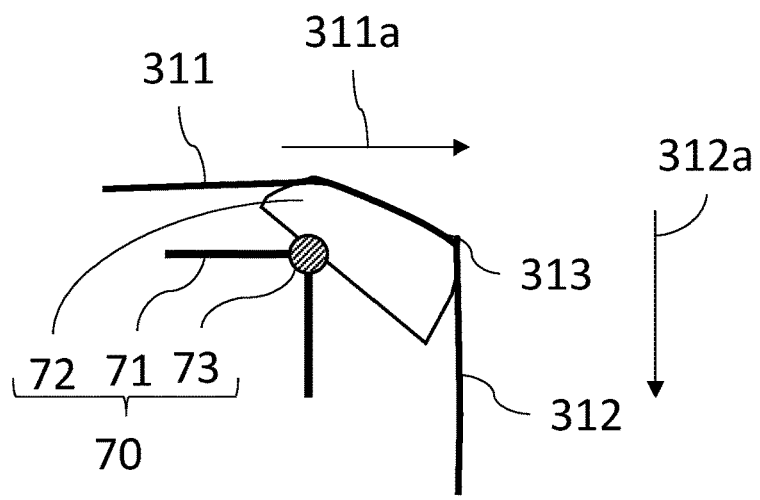

FIGS. 7, 8 and 9 shows exemplary embodiments of deflection elements 70 comprised in tunable optical devices 1. The first fiber 310 comprises a first section 311 having a first main direction of extension 311a, a second section 312 having a second main direction of extension 312a and a deflection section 313. The deflection section 313 is arranged between the first section 311 and the second section 312 along the first fiber 310. In the deflection section 313 the first fiber 310 is in contact with a deflection element 70. The first main direction 311a of extension is obliquely with respect to the second main direction of extension 312a.

The deflection element 70 comprises a mount 71 and a guide element 72. The guide element 72 is arranged to guide the deflection section 313 and the guide element 72 is in direct contact with the deflections section 313. The guide element 72 is pivotably connected to the mount 71 at a fulcrum 73.

In the embodiment of FIG. 7, the portion of the guide element 72 which is in contact with the deflection section 313 has a constant radius of curvature and the fulcrum is arranged in a position which is equidistant to the said portion. Thus, the deflection element does not alter the leverage of the first fiber 310.

In the embodiment of FIG. 8, the portion of the guide element 72 which is in contact with the deflection section 313 has a smaller radius of curvature on a side closer to the first section than on a side closer to the second section 312. Thus, a distance between the fulcrum 73 and the deflection section 313 varies along the deflection section 313. The fulcrum is arranged in a position which is closer to the second section than to the first section. Thus, the deflection element alters the leverage of the first fiber 310, which results in a smaller deflection of the first portion than the deflection of the second portion for a given stroke.

In the embodiment of FIG. 9, the portion of the guide element 72 which is in contact with the deflection section 313 has a larger radius of curvature on a side closer to the first section than on a side closer to the second section 312. Thus, a distance between the fulcrum 73 and the deflection section 313 varies along the deflection section 313. The fulcrum is arranged in a position which is closer to the first section than to the second section. Thus, the deflection element alters the leverage of the first fiber 310, which results in a larger deflection of the first portion than the deflection of the second portion for a given stroke.

Figure 10:
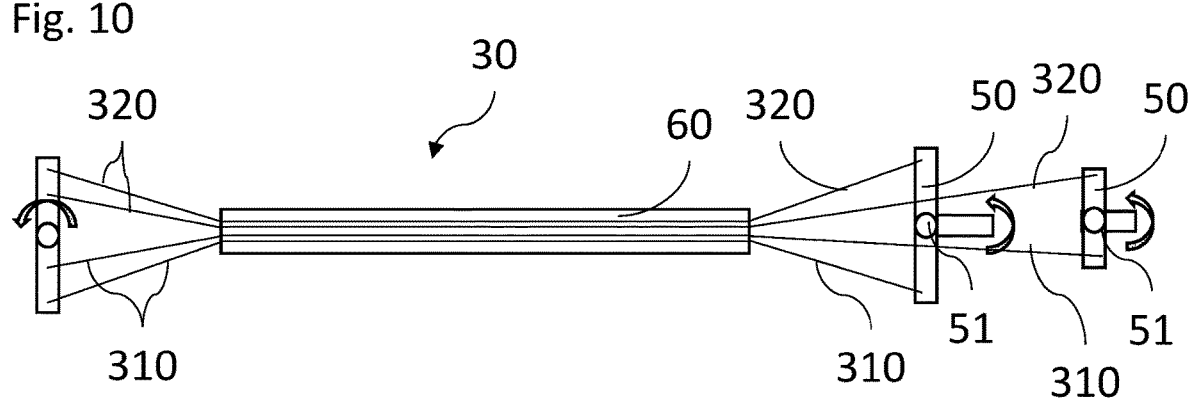
FIG. 10 an exemplary embodiment of a transmission unit having first and second fibers comprised in a tunable optical device in a schematic sectional view.

FIG. 10 shows an exemplary embodiment of a transmission unit 30 having first fibers 310, second 320 fibers and a pivot element 50 comprised in a tunable optical device in a schematic sectional view. The first 310 and second 320 fibers are guided in a hull 60.

The pivot element 50 comprises a pivot point 51 around which the pivot element 50 is rotatable. The second end 310b of the first fiber 310 and a second end 320b of the second fiber 320 are connected to opposite sides of the pivot element 50 with respect to the pivot point 51. The tensile forces of the first fibers 310 causes a rotation of the pivot element 50 in a first direction, in particular a clockwise direction, and the tensile forces in the second fibers 320 causes a rotation of the pivot element 50 in a second direction, in particular a counter clockwise direction, wherein the first direction is opposed to the second direction. In particular, the tensile forces of the second fibers 320 are the retention forces for the first fibers 310.

Figure 11:
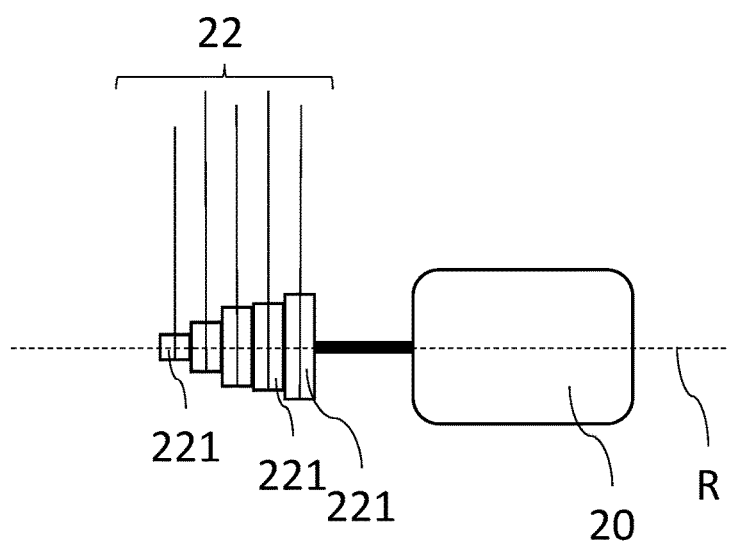
FIGS. 11 and 12 an exemplary embodiment of a winding element comprised in a tunable optical device in views from two different sides.
Figure 12:
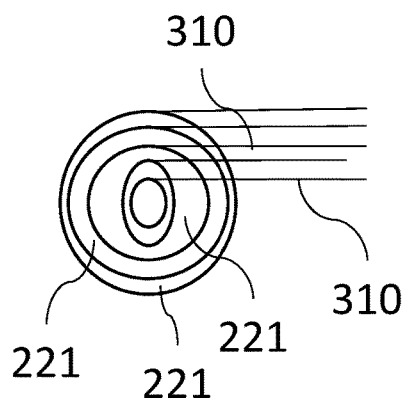

FIGS. 11 and 12 an exemplary embodiment of a winding element 22 comprised in a tunable optical device in views from two different sides. The actuator 20 comprises a winding element 22, wherein multiple first fibers 310 are at least partially wound around the winding element 22. The actuator 20 is arranged to rotate the winding element 22 around a rotational axis R, wherein the tensile force is generated by rotation of the winding element 22.

As shown in a view along the rotational axis R in FIG. 12, the winding element 22 has a cylindrical shape and comprises multiple sections 221. The first fibers are respectively wound around one of the sections 221, and at least two sections 221 have a different diameter and/or the cylindrical shape has a non-circular cross-sectional area.

Figure 13:
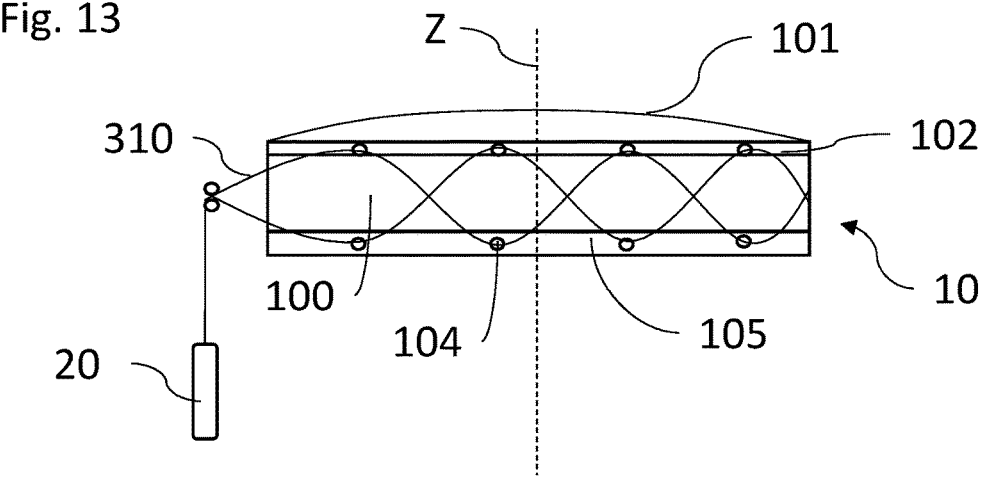
FIG. 13 an exemplary embodiment of an optical element comprised in a tunable optical device in a schematic side view.

FIG. 13 shows an exemplary embodiment of an optical element 10 comprised in a tunable optical device 1 in a schematic side view. The transmission unit 30 comprises two first fibers 310, which are arranged crosswise around the circumference of the optical element 10. The actuator 20 provides a tensile force, whereby a distance between the back window 105 and the shaping element 102 is reduced. This motion increases the pressure in the volume 100, whereby the membrane 101 is deflected along the optical axis z.

Figure 14A:
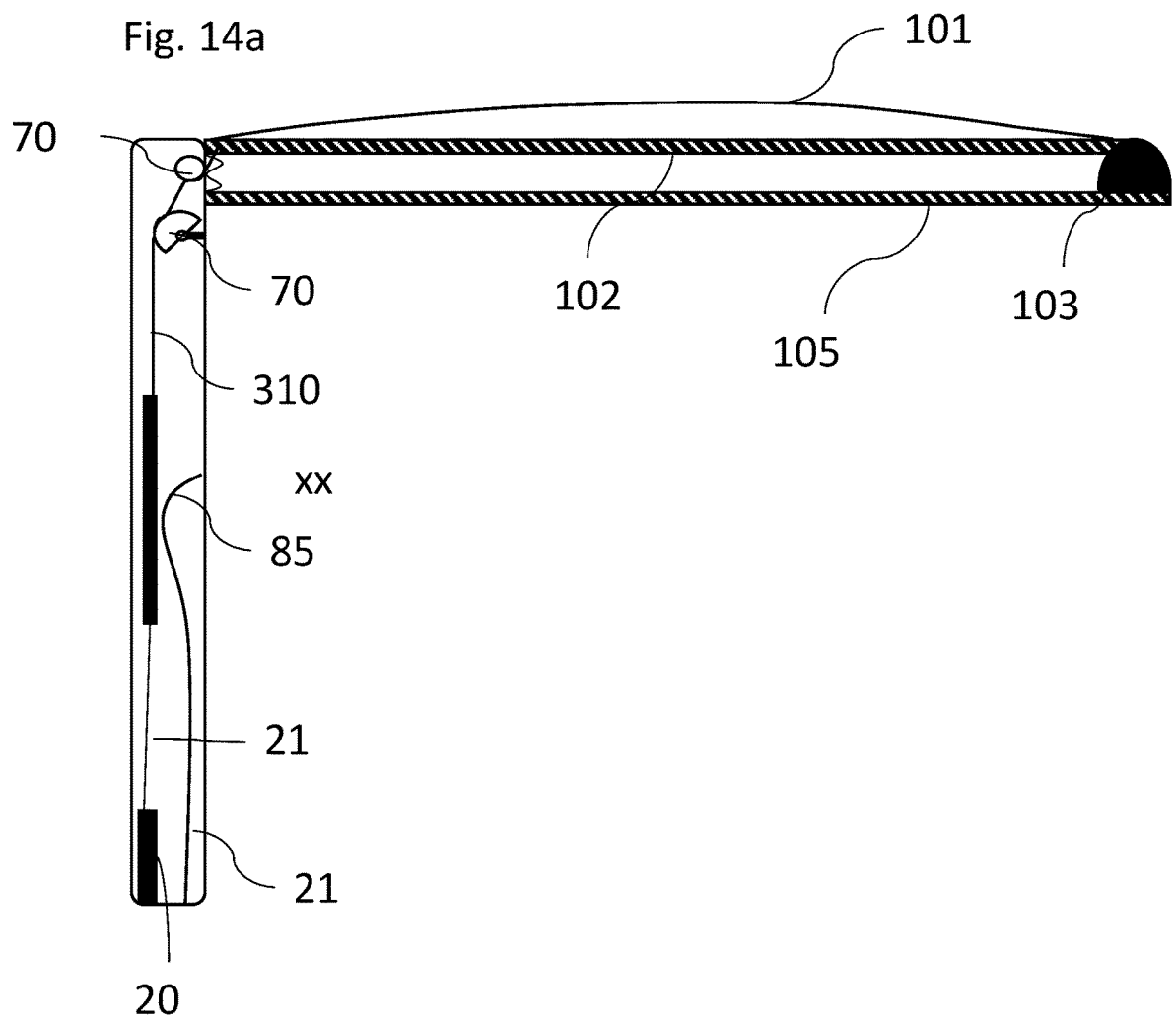
FIGS. 14a, 14b and 14c an exemplary embodiment of a tunable optical device in a schematic sectional view.

FIG. 14a shows an exemplary embodiment of a tunable optical device 1 in a schematic sectional view. The actuator 20 comprises a shape memory alloy 21. The shape memory alloy 21 is arranged to provide the tensile force transferred by the first fiber 310 to the optical element 10. The shape memory alloy 21 may be actuated by means of an electrical current in the shape memory alloy 21.

In particular, the first fiber 310 comprises the shape memory alloy or the first fiber 310 consists of the shape memory alloy 21.

A movement of the shaping element 102 is guided by means of a hinge 103. The hinge 103 guides the relative motion of the shaping element 102 and the back window 105, wherein the shaping element 102 is stiff. Advantageously, the tuning state of the optical element is particularly simple to control, because of the guided motion f the shaping element 102.

The tunable optical device 1 comprises a locking unit 80 with a shape memory alloy 21 and a spring 85. In an on state, the spring pushes the first fiber 310 against a sidewall of the temple, whereby a motion of the first fiber 310 is blocked. In an off-state, the shape memory alloy pulls the spring 85 away from the first fiber 310. Whereby the first fiber is not limited in its motion by the spring 85.

Figure 14B:
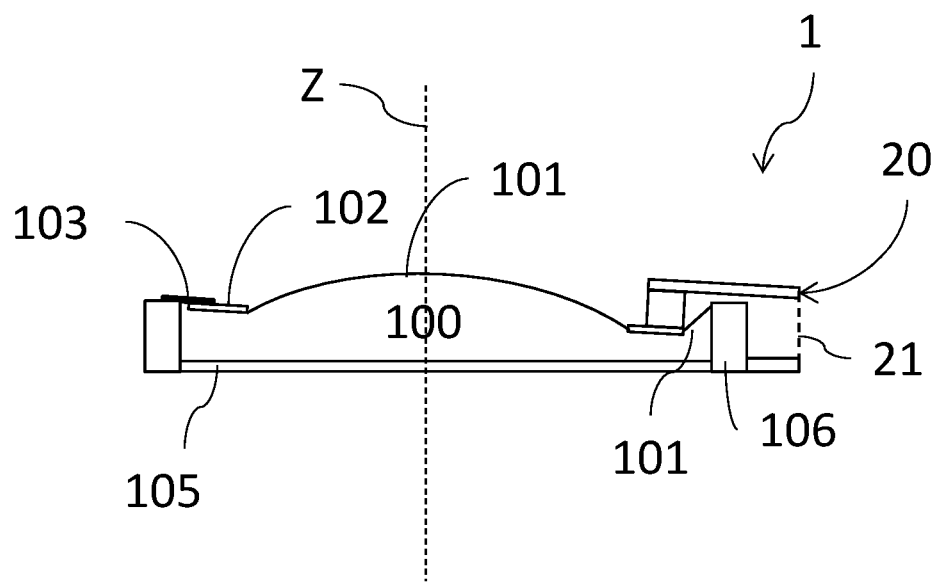

FIG. 14b shows an exemplary embodiment of a tunable optical device 1 in a schematic sectional view. The actuator 20 comprises a shape memory alloy 21 which forms the first fiber 310. The shape memory alloy 21 is arranged to provide the tensile force transferred by the first fiber 310 to the optical element 10. A movement of the shaping element 102 is guided by means of the hinge 103. The hinge 103 guides the relative motion of the shaping element 102 and the back window 105, wherein the shaping element 102 is stiff. The volume 100 is delimited by means of the rigid container 106, the back window 105 and the membrane 101. The membrane 101 extends at least partially between the shaping element 102 and the container 106. The membrane 101 may be deformed elastically when the shaping element swiveled with respect to the back window 105, whereby at least parts of the shaping elements may be deflected along the optical axis Z. The hinge 103 limits the motion of the shaping element 102 along the optical axis Z in at least on section, whereby the hinge defines the axis of rotation of the shaping element 102 with respect to the back window 105.

Figure 14C:
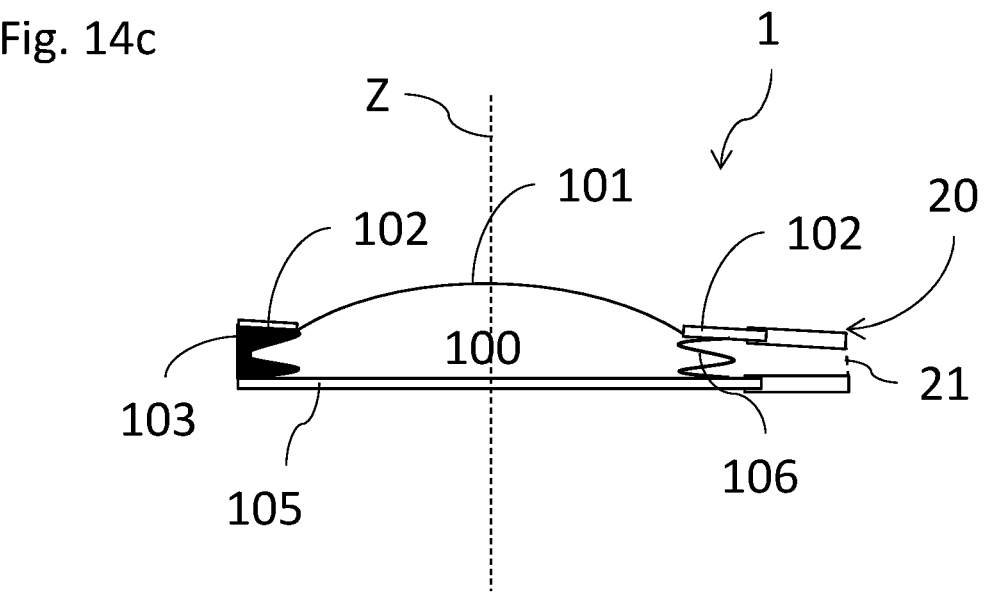

FIG. 14c shows an exemplary embodiment of a tunable optical device 1 in a schematic sectional view. The actuator 20 works similar to the actuator shown in FIG. 14b. A bellows structure 106 delimits the volume 100 laterally. Here an in the following lateral direction extend perpendicular with respect to the optical axis Z. The bellows structure 106 may be formed from a folded membrane, which is extendable along the optical axis Z. The hinge 103 may be formed by means of a stiffened section of the bellows structure 106. For example, the bellows structure is locally stiffened by means of an adhesive, which is applied to the bellows structure 106.

Figure 15:
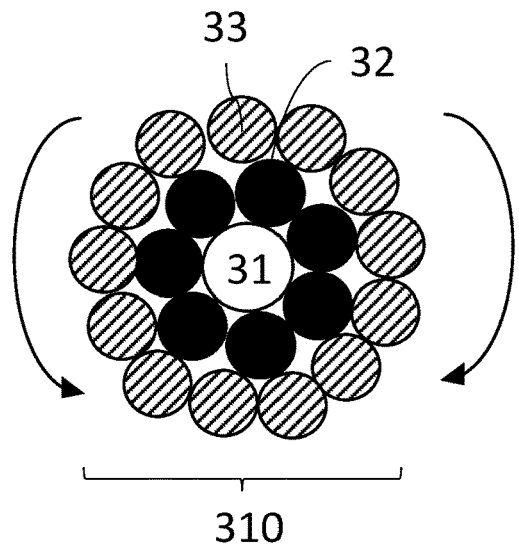
FIGS. 15 and 16 show an exemplary embodiment of a first fiber forming a flexible shaft in schematic sectional views.

FIG. 15 shows an exemplary embodiment of a first fiber 310 forming a flexible shaft in a schematic sectional view in a direction. The first fiber 310 comprises a core wire 31 and the sectional view is in a direction perpendicular to the main extension direction of a core wire 31. Two layers of wires are wound around the core wire 31. The first wire layer 32 is wound in a clockwise direction around the core wire 31 and the second wire layer 33 is wound in a counterclockwise direction around the first wire layer 32. Thus, the tensile force in the first wire layer 32 transmits torque in a clockwise direction and the tensile force in the second wire layer 33 transmits torque in a counterclockwise direction.

Figure 16:
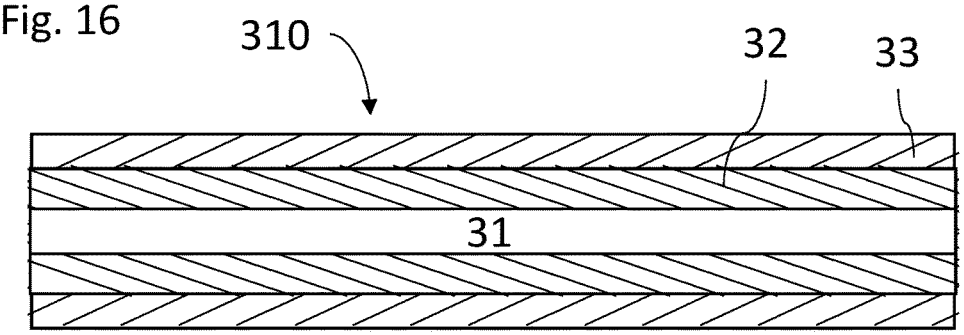

FIG. 16 shows the exemplary embodiment of the first fiber forming a flexible shaft in a schematic side view in a direction along the main extension direction of the core wire 31. In particular, the first fiber 310 may comprise further wire layers.

Figure 17:
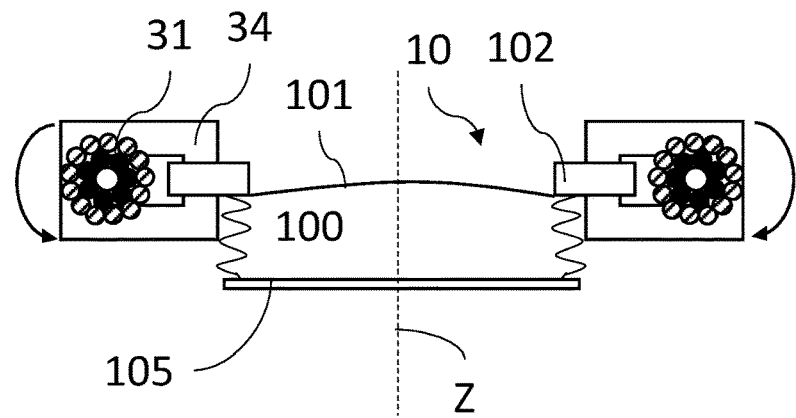
FIG. 17 an exemplary embodiment of a tunable optical device connected to a flexible shaft in a schematic sectional view.

FIG. 17 shows an exemplary embodiment of a tunable optical device 10 connected to a flexible shaft in a schematic sectional view. The first fiber 310 forms the flexible shaft. The actuator 20 (not shown) transmits a torque to the first end 310a of the first fiber 310. The torque results in a rotation of the first fiber 310 around its main axis of extension, in particular around the core wire. The optical element 10 is arranged to transduce the torque into the change of the optical property. The transmission unit 30 comprises at least one connection element 34, which couples the first fiber 31 and the shaping element 102 mechanically. The connection element 34 is arranged to transmit torque in a clockwise direction and in a counterclockwise direction. The torque deflects the shaping element 102 along the optical axis Z, which results in a change of the surface profile of the membrane 101, whereby at least one optical property of the tunable optical element 10 is altered.

The invention is not restricted to the exemplary embodiments by the description thereof. Rather, the invention encompasses every new feature and every combination of features, which in particular includes every combination of features in the patent claims, even if this feature or this combination itself is not explicitly specified in the patent claims or exemplary embodiments.

LIST OF REFERENCE SIGNS

1 Tunable optical device
10 Tunable optical element
20 Actuator
30 Transmission unit
310 First fiber
90 Head mountable device
91 temple
60 hull
311 First section
312 Second section
313 Deflection section
100 volume
101 Membrane
102 Shaping element
103 hinge
104 deflection point
105 Back window
106 Bellows
310a First end of first fiber
310b Second end of first fiber
70 Deflection element
40 Retention element
80 Locking unit
81 Locking fiber
82 Locking pad
23 lever
231 Attachment point
232 bearing
83 Control unit
84 accelerometer
71 mount
72 Guide element
73 fulcrum
z Optical axis
311a Main direction of extension of first section
312a Main direction of extension of second section
50 Pivot element
51 Pivot point
320 Second fiber
22 Winding element
221 section
R Rotational axis
21 Shape memory alloy
85 spring
106 container
31 Core wire
32 First wire layer
33 Second wire layer
34 Connection element
107 Contact elements

We claim:

1. Tunable optical device comprising an optical element, an actuator and a transmission unit, wherein
the transmission unit comprises a first fiber,
the first fiber is arranged to transmit a tensile force from the actuator to the optical element, and
the tensile force result in a change of an optical property of the optical element, wherein
the tunable optical device further comprises a retention element, wherein the retention element is arranged to generate a retention force, wherein
the retention force acts in an opposite direction with respect to the tensile force,
the first fiber comprises a first end and a second end, wherein the first end is coupled to
the actuator and the second end is coupled to the optical element,
the tensile force acts on the first end, and the retention force acts on the second end.

2. Tunable optical device according to claim 1, comprising a second fiber and a pivot element, wherein
the pivot element comprises a pivot point around which the pivot element is rotatable,
the second end of the first fiber and a second end of the second fiber are connected to opposite sides of the pivot element with respect to the pivot point, wherein
the tensile force of the first fiber causes a rotation of the pivot element in a first direction and the tensile force in the second fiber causes a rotation of the pivot element in a second direction, wherein the first direction is opposed to the second direction.

3. Tunable optical device according to claim 1, wherein the first fiber comprises a first section having a first main direction of extension, a second section having a second main direction of extension and a deflection section, wherein
the deflection section is arranged between the first section and the second section along the first fiber, and
the first main direction of extension is obliquely with respect to the second main direction of extension, and
in the deflection section the first fiber is in contact with a deflection element.

4. Tunable optical device according to claim 3, wherein the deflection element comprises a mount and a guide element,
the guide element is arranged to guide the deflection section,
the guide element is in direct contact with the deflections section,
the guide element is pivotably connected to the mount at a fulcrum, wherein a distance between the fulcrum and the deflection section varies along the deflection section.

5. Tunable optical device according to claim 1, wherein the transmission unit comprises a hull, wherein the first fiber and the hull form a Bowden cable.

6. Tunable optical device according to claim 1, comprising a locking unit, wherein in an on-state the locking unit is arranged to maintain the optical property at defined state, and in an off-state the locking unit does not confine changes of the optical property.

7. Tunable optical device according to claim 6, comprising a control unit and an accelerometer, wherein the accelerometer is arranged to measure an acceleration force acting on the optical device,
the accelerometer transmits an output signal to the control unit,
the output signal depends on a measured acceleration, and
the control unit is arranged to set the locking unit to an on-state when the output signal of the accelerometer exceeds a predefined value.

8. Tunable optical device according to claim 1, wherein the actuator comprises a shape memory alloy.

9. Tunable optical device according to claim 8, wherein the first fiber comprises the shape memory alloy or the first fiber consists of the shape memory alloy.

10. Tunable optical device according to claim 1, wherein the actuator comprises a winding element,
the first fiber is at least partially wound around the winding element,
the actuator is arranged to rotate the winding element, wherein the tensile force is generated by rotation of the winding element.

11. Tunable optical device according to claim 10, comprising multiple first fibers, wherein the first fibers are arranged to transfer a tensile force from the actuator to the optical element,
the winding element has a cylindrical shape,
winding element comprises multiple sections, wherein each first fiber is wound around one of the sections, and
at least two sections have a different diameter and/or the cylindrical shape has a non-circular cross-sectional area.

12. Tunable optical device according to claim 1, comprising multiple first fibers, wherein the first fibers are arranged to transfer tensile force from the actuator to the optical element,
the actuator comprises a lever,
the first ends of the first fibers are coupled at different attachment points of the lever respectively.

13. Tunable optical device according to claim 1, wherein
the optical element comprises a volume which is filled with a liquid,
the volume is delimited by means of a membrane, wherein the membrane forms an optical surface of the optical element,
the membrane is connected to a shaping element, wherein the tensile forces act on the shaping element, and the tensile forces result in a change of the shape of the optical surface, and the change of the shape of the optical surface results in a change of the optical property.

14. Tunable optical device according to claim 13, wherein a movement of the shaping element is guided by means of a hinge, or
wherein the shaping element is elastically deformable,
the actuator comprises multiple first fibers, and
the tensile forces are transferred to multiple deflection points of the shaping element, wherein the deflection points are spaced apart from one another.

15. Tunable optical device according to claim 1, wherein the first fiber forms a flexible shaft,
the actuator transmits a torque to the first end of the first fiber,
the torque results in a rotation of the first fiber around its main axis of extension, and
the optical element is arranged to transduce the torque into the change of the optical property.

16. Tunable optical device comprising an optical element, an actuator and a transmission unit, wherein
the transmission unit comprises a first fiber,
the first fiber is arranged to transmit a tensile force from the actuator to the optical element, and
the tensile force result in a change of an optical property of the optical element, wherein
the tunable optical device further comprises a locking unit, wherein in an on-state the locking unit is arranged to maintain the optical property at defined state, and in an off-state the locking unit does not confine changes of the optical property.

17. Tunable optical device comprising an optical element, an actuator and a transmission unit, wherein
the transmission unit comprises a first fiber,
the first fiber is arranged to transmit a tensile force from the actuator to the optical element, and
the tensile force result in a change of an optical property of the optical element,
wherein the optical element comprises a volume which is filled with a liquid, the volume is delimited by means of a membrane, wherein the membrane forms an optical surface of the optical element,
wherein the membrane is connected to a shaping element, wherein the tensile forces act on the shaping element, and the tensile forces result in a change of the shape of the optical surface, and the change of the shape of the optical surface results in a change of the optical property, and wherein a movement of the shaping element is guided by means of a hinge, or wherein the shaping element is elastically deformable, and wherein the actuator comprises multiple first fibers, and the tensile forces are transferred to multiple deflection points of the shaping element, wherein the deflection points are spaced apart from one another.

\* \* \* \* \*